(12) United States Patent
Hwang et al.

(10) Patent No.: US 8,084,568 B1
(45) Date of Patent: Dec. 27, 2011

(54) POLY(ARYLENE ETHER) COPOLYMER HAVING CATION-EXCHANGE GROUP, PROCESS OF MANUFACTURING THE SAME, AND USE THEREOF

(75) Inventors: Inchul Hwang, Gyeonggi-do (KR); Nak Hyun Kwon, Seoul (KR); Young Taek Kim, Seoul (KR); Dong Il Kim, Incheon (KR); Ju Ho Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/960,889

(22) Filed: Dec. 6, 2010

(30) Foreign Application Priority Data

Jul. 13, 2010 (KR) .................. 10-2010-0067413

(51) Int. Cl.
*C08G 8/02* (2006.01)
(52) U.S. Cl. ........ 528/125; 528/171; 528/295; 528/220; 528/373; 521/27; 429/479; 429/480; 429/498; 429/493; 429/429
(58) Field of Classification Search .................. 528/125, 528/171, 295, 220, 373; 521/27; 429/479, 429/480, 498, 493, 429
See application file for complete search history.

(56) References Cited

U.S. PATENT DOCUMENTS

2009/0203806 A1 * 8/2009 Liu et al. .................. 521/27

FOREIGN PATENT DOCUMENTS

WO WO03095520 * 11/2003

* cited by examiner

*Primary Examiner* — Randy Gulakowski
*Assistant Examiner* — Shane Fang
(74) *Attorney, Agent, or Firm* — Edwards Wildman Palmer LLP; Peter F. Corless (57) ABSTRACT

The present invention relates to a poly(arylene ether) copolymer having an ion exchange group, particularly a positive ion exchange group, a method for manufacturing the same, and use thereof. In the poly(arylene ether) copolymer having the ion exchange group according to the present invention, physical characteristics, ion exchanging ability, metal ion adsorption ability and a processability are excellent, and thus the copolymer can be molded in various shapes and can be extensively applied to various fields such as recovering of organic metal, air purification, catalysts, water treatment, medical fields and separating of proteins.

23 Claims, 2 Drawing Sheets

POLY(ARYLENE ETHER) COPOLYMER HAVING CATION-EXCHANGE GROUP, PROCESS OF MANUFACTURING THE SAME, AND USE THEREOF

CROSS-REFERENCE TO RELATED APPLICATION

This application claims priority to and the benefit of Korean Patent Application No. 10-2010-0067413 filed in the Korean Intellectual Property Office on Jul. 13, 2010, the entire contents of which are incorporated herein by reference.

BACKGROUND OF THE INVENTION (a) Field of the Invention

The present invention generally relates to a poly(arylene ether) copolymer having an ion exchange group, particularly a positive ion exchange group, a method for manufacturing the same, and use thereof.

(b) Description of the Related Art

An ion exchange resin generally comprises an ion exchange functional group on a polymer. In particular, an ion exchange resin typically comprises a porous polymer structure containing functional groups with mobile ions, and may have fine pore size in a state of moisture. In general, ion exchange occurs when ions become trapped in or on the surfaces of the pores while other ions are simultaneously released. Ion exchange resins are broadly classified into a positive ion exchange resin, a negative ion exchange resin, and a mixed resin depending on the type of ion exchange functional group to be introduced (e.g. those that exchange positive ions—also called cation resins; those that exchange negative ions—also called anion resins; and those that exchange both positive and negative ions—mixed resins). Such ion exchange resins have been used for various purposes such as recovering of organic metal, air purification, catalysts, water treatment, medical fields and separation of proteins.

One example of a commercially available positive ion exchange resin is a styrene-based resin. In the styrene-based resin, an ion exchange group is introduced to the resin, which has a three dimensional network structure manufactured by using divinylbenzene as a crosslinking agent on styrene. Typically a sulfonic acid group is used as the exchange group. While such a resin is generally chemically stable to strong acids and bases and allows for ion exchanging in the entire pH range, if it is heated to temperatures of 150° C. or more, the resin is decomposed to reduce exchange capacity, density, and moisture adsorption ability. Further, if the resin is heated at 186° C. for 24 hours, it cannot be used because the exchange capacity is reduced by 15 to 40%.

In addition, most currently available ion exchange resins have limited ion exchange capacity, and processability is reduced because most resins are crosslinked. Thus, there is a need for a novel ion exchange resin that addresses these disadvantages.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a poly(arylene ether) copolymer that possesses excellent properties. In particular, the present poly(arylene ether) copolymer possesses excellent mechanical properties and high ion exchange ability, particularly positive ion exchange ability. The present invention also provides a method for manufacturing the copolymer. Further, the present invention provides an ion exchange resin, particularly a positive ion exchange resin, including the copolymer and an ion exchange film, particularly a positive ion exchange film. It is noted that while positive ion exchange ability and positive ion exchange groups are described in particular in connection with embodiments of the invention, it is understood that negative and mixed ion exchange ability and ion exchange groups are also included in the present invention. Thus, when used herein, the term "ion exchange film" is understood to include positive, negative, and mixed ion exchange films.

One embodiment of the present invention provides a poly (arylene ether) copolymer represented by Formula 1:

[Formula 1]

wherein,

X ranges from about 0.01 to 1.0;

n is an integer ranging from about 10 to 800;

at least one of the R's is a sulfonic acid group ($-SO_3^-M^+$), a phosphoric acid group ($-PO_3^-M^+$) or a carboxyl group ($-COO^-M^+$), and the remainder is/are a hydrogen group ($-H$), wherein $M^+$ is a positive ion;

$Ar_1$ is one or more substituent groups that are selected from the group consisting of the following Formula 5a,

[Formula 5a]

Ar$_2$ is one or more substituent groups that are selected from the group consisting of the following Formula 6a,

[Formula 6a]

Another embodiment of the present invention provides a poly(arylene ether) copolymer represented by Formula 2:

[Formula 2]

wherein Ar$_1$, Ar$_2$, X and n are the same as those of Formula 1.

Yet another embodiment of the present invention provides a poly(arylene ether) copolymer that is represented by Formula 3, which has sulfonic acid groups:

[Formula 3]

wherein Ar$_1$, Ar$_2$, X and n are the same as those of Formula 1.

The copolymers according to Formulas 1 to 3 may be a random copolymer or a block copolymer.

According to some embodiments, in the copolymers according to Formulas 1 to 3, X may range from 0.1 to 0.9.

According to various embodiments, in the copolymers according to Formulas 1 to 3, the weight average molecular weight may range from about 10,000 to 1,000,000.

Another aspect of the present invention provides a method for manufacturing the present poly(arylene ether) copolymer, particularly the poly(arylene ether) copolymer of Formula 1, 2 or 3 including: a) copolymerizing 2,2'-diphenyl-p,p-biphenol of the following Formula 4, one or more monomers that are selected from the group consisting of the following Formula 5b, and one or more monomers that are selected from the group consisting of the following Formula 6b; and b) introducing an ion exchange group, particularly a positive ion exchange group, into the copolymerized polymer:

[Formula 4]

[Formula 5b]

Wherein the positive ion exchange group is a sulfonic acid group (—$SO_3^-$ $M^+$), a phosphoric acid group (—$PO_3^-M^+$) or a carboxyl group (—$COO^-M^+$), and $M^+$ is a positive ion, And wherein in Formula 5b, X is an atom that is each independently selected from a halogen group.

In various embodiments, in a) the copolymerizing of the monomers may be conducted so that an equivalent ratio of one or more monomers that are selected from the group consisting of Formula 5b, 2,2'-diphenyl-p,p-biphenol, and one or more monomers that are selected from the group consisting of Formula 6b is 1:0.05 to 0.95:0.05 to 0.95.

In some embodiments, a) the copolymerizing of the monomers may be conducted in the presence of one or more solvents that are selected from the group consisting of dimethylacetamide, N-methylpyrrolidone, dimethylformamide, dimethyl sulfoxide, methylene chloride, chloroform, tetrahydrofuran, benzene, toluene and xylene.

According to various embodiments, in b) the introducing of the ion exchange group into the copolymerized polymer may be conducted by using one or more sulfonic acid compounds that are selected from the group consisting of a concentrated sulphuric acid ($H_2SO_4$), a chlorosulfonic acid ($ClSO_3H$), a fuming sulfuric acid (fuming $SO_3$) and fuming sulfuric acid triethylphosphate ($SO_3$-TEP).

In b) the introducing of the ion exchange group into the copolymerized polymer, any suitable temperatures can be used, and in some embodiments the introduction may be conducted at a temperature in the range of about 0 to 100° C.

According to another aspect, the present invention provides an ion exchange resin, particularly a positive ion exchange resin, including the present poly(arylene ether) copolymer. In one embodiment, an ion exchange resin including the poly(arylene ether) copolymer according to Formula 1 is provided. In another embodiment, an ion exchange resin including the poly(arylene ether) copolymer according to Formula 2 is provided. In another embodiment, an ion exchange resin including the poly(arylene ether) copolymer according to Formula 3 is provided.

In various embodiments, the positive ion exchange film may further include one or more polymers that are selected from the group consisting of polyimide, polyetherketone, polysulfone, polyethersulfone, polyetherethersulfone, polybenzimithzole, polyphenylene oxide, polyphenylenesulfide, polystyrene, polytrifluorostyrene sulfonic acid, polystyrene sulfonic acid, polyvinylidenefluoride, polyurethane and branched-chained sulfonated polysulfoneketone copolymer.

In various embodiments, the positive ion exchange film may further include one or more inorganic materials that are selected from the group consisting of silicon oxide $SiO_2$, titanium oxide $TiO_2$, inorganic phosphoric acid, sulfonated silicon oxide (Sulfonated $SiO_2$), sulfonated zirconium oxide (sulfonated ZrO) and sulfonated zirconium phosphate (sulfonated ZrP).

According to the present invention, a poly(arylene ether) copolymer having an ion exchange group, particularly a positive ion exchange group, possesses excellent physical characteristics, ion exchanging ability, metal ion adsorption ability and processability, and can further be molded in various shapes. As such, the present copolymer will extensively apply to various fields such as recovering of organic metal, air purification, catalysts, water treatment, medical fields and separation of proteins.

DETAILED DESCRIPTION OF THE EMBODIMENTS

Hereinafter, a poly(arylene ether) copolymer according to an exemplary embodiment of the present invention, a method for manufacturing the same, and use thereof will be described.

The present inventors have, through repeated studies of the positive ion exchange resin, discovered that a polymer having a positive ion exchange group that is dense while a side chain of a hydrophilic portion of the copolymer is long can be manufactured to provide improved properties. In particular, such a polymer can be manufactured by introducing the positive ion exchange group after a 2,2'-diphenyl-p,p-biphenol compound is copolymerized with a predetermined first and second monomer, particularly a predetermined dihydroxy monomer and dihalide monomer. Applicants further discovered that it is possible to easily control the introduction amount of the positive ion exchange group by introducing an equivalent amount of a functionalizing agent. Positive ion exchange films manufactured using the present polymer possess excellent physical characteristics, ion exchange ability and metal ion adsorption ability.

According to an exemplary embodiment of the present invention, a poly(arylene ether) copolymer represented by the following Formula 1:

[Formula 1] is provided:

[Formula 1]

wherein,

X ranges from about 0.01 to 1.0;

n is an integer and ranges from about 10 to 800;

at least one of R's is a sulfonic acid group ($-SO_3^-M^+$), a phosphoric acid group ($-PO_3^-M^+$) or a carboxyl group ($-COO^-M^+$), and the remainder is/are a hydrogen group ($-H$), and wherein $M^+$ is a positive ion;

$Ar_1$ is one or more substituent groups that are selected from the group consisting of the following Formula 5a,

[Formula 5a]

$Ar_2$ is one or more substituent groups that are selected from the group consisting of the following Formula 6a,

[Formula 6a]

In some preferred embodiments, n ranges from about 20 to 800. Further, in some embodiments X is preferably about 0.1 to 0.9, and more preferably about 0.2 to 0.8.

In particular, a copolymer according to an exemplary embodiment of the present invention is a poly(arylene ether) copolymer that is represented by the following Formula 3, which has a sulfonic acid group:

[Formula 3]

In Formula 3, $Ar_1$, $Ar_2$, X and n are the same as those of Formula 1.

Generally, in the main chain of the polymer, the hydrophilic portion plays a role for transporting a positive ion, and the hydrophobic portion plays a role for supporting physical properties of a film. The performance of the polymer film may, thus, be varied depending on the design structure of the hydrophilic portion and/or hydrophobic portion.

For example, as shown in Formula 3, the sulfonated poly(arylene ether) copolymer is a polymer that is designed so that the side chain length of the hydrophilic portion is long and the sulfonic acid group is dense. It is believed that when the polymer film is formed, the dimensional stability to moisture can be ensured by good formation of the ion channel, presenting the positive ion with high exchange ability, and relatively widening the hydrophobic portion.

A poly(arylene ether) copolymer of Formula 1 may be manufactured by introducing a positive ion exchange group, such as a sulfonic acid group, a phosphoric acid group, or a carboxyl group, to the poly(arylene ether) copolymer represented by the following Formula 2. The manufacturing method thereof is described in further detail herein.

[Formula 2]

In Formula 2, $Ar_1$, $Ar_2$, X and n are the same as those of Formula 1.

The poly(arylene ether) copolymer of Formulas 1 to 3 in the embodiments of the present invention may be a random copolymer or a block copolymer.

Further, according to embodiments of the present invention, the molecular weight of the poly(arylene ether) copolymer of Formulas 1 to 3, in consideration of the mechanical properties and positive ion exchange ability and the like, can be easily determined by a person with ordinary skill in the art to which the present invention pertains. Preferably, the weight average molecular weight may be about 10,000 to 1,000,000, and more preferably about 30,000 to 800,000.

According to another exemplary embodiment of the present invention, a method for manufacturing the poly(arylene ether) copolymer of Formula 1 includes:

a) copolymerizing 2,2'-diphenyl-p,p-bphenol of the following Formula 4, one or more monomers that are selected from the group consisting of the following Formula 5b, and one or more monomers that are selected from the group consisting of the following Formula 6b; and b) introducing an ion exchange group, particularly a positive ion exchange group, into the copolymerized polymer:

[Formula 4]

[Formula 5b]

[Formula 6b]

In various embodiments, the positive ion exchange group is a sulfonic acid group ($-SO_3^-M^+$), a phosphoric acid group ($-PO_3^-M^+$) or a carboxyl group ($-COO^-M^+$), in Formula 5b, X is an atom that is each independently selected from a halogen group.

Hereinafter, steps of the manufacturing method according to an exemplary embodiment of the present invention will be described.

However, the following steps describe only one embodiment of the manufacturing method according to the present invention, and the manufacturing method may further include various other/additional steps that are generally conducted in the art to which the present invention pertains.

a) Step for Copolymerizing Monomers

In this step, polycondensation of the monomers to synthesize the poly(arylene ether) copolymer according to Formula 2 is carried out. this step can be conducted through a nucleophilic substitution reaction via an activation step and a polymerization step. Such a nucleophilic substitution reaction is known, and the present method can be conducted under the general conditions known in the art to which the present invention pertains.

In this step, the X value of Formula 1 may be determined according to the content ratio of each monomer. In a preferred embodiment, the equivalent ratio of one or more monomers that are selected from the group consisting of Formula 5b: 2,2'-diphenyl-p,p-biphenol of Formula 4: one or more monomers that are selected from the group consisting of Formula 6b may be 1:0.05 to 0.95:0.05 to 0.95, and more preferably, 1:0.2 to 0.8:0.2 to 0.8.

According to an embodiment of the present invention, the monomers may be added by controlling the contents of the monomers within a range such that the sum of the mole number of 2,2'-diphenyl-p,p-biphenol of Formula 4 and one or more monomers that are selected from the group consisting of Formula 6b is the same as the mole number of the one or more monomers selected from the group consisting of Formula 5b.

In particular, the equivalent ratio of one or more monomers that are selected from the group consisting of Formula 5b: 2,2'-diphenyl-p,p-biphenol of Formula 4: one or more monomers that are selected from the group consisting of Formula 6b may be, but are not limited to, for example, (1:0.95:0.05), (1:0.9:0.1), (1:0.85:0.15), (1:0.8:0.2), (1:0.75:0.25), (1:0.7:0.3), (1:0.65:0.35), (1:0.6:0.4), (1:0.55:0.45), (1:0.5:0.5), (1:0.45:0.55), (1:0.4:0.6), (1:0.35:0.65), (1:0.3:0.7), (1:0.25:0.75), (1:0.2:0.8), (1:0.15:0.85), (1:0.1:0.9), or (1:0.05:0.95). Preferably, this step may be conducted in the presence of one or more solvents that are selected from the group consisting of dimethylacetamide, N-methylpyrrolidone, dimethylformamide, dimethyl sulfoxide, methylene chloride, chloroform, tetrahydrofuran, benzene, toluene and xylene.

According to an exemplary embodiment of the present invention, the above step may be conducted by mixing the monomers in the solvent, performing the activation step at about 100 to 180° C. for about 2 to 4 hours, gradually increasing the temperature to about 120 to 200° C., performing the polymerization reaction for about 12 to 48 hours, washing with the solvent, and drying.

b) Step for Introducing a Positive Ion Exchange Group into the Copolymerized Polymer In this step, the positive ion exchange group is introduced into the poly(arylene ether) copolymer according to Formula 2.

In particular, in this embodiment, the positive ion exchange group may be a sulfonic acid group ($-SO_3^-M^+$), a phosphoric acid group ($-PO_3^-M^+$) or a carboxyl group ($-COO^-M^+$). The method for introducing the positive ion exchange group into the copolymer may be conducted according to a general method (which is known to one of skill in the art) for reacting the copolymer with the sulfonic acid compound, the phosphoric acid compound or the carboxylic acid compound. The sulfonic acid compound is not particularly limited and may include, for example, any general sulfonic acid compound known in the art to which the present invention pertains. According to a preferred embodiment, one or more sulfonic acid compounds are selected from the group consisting of a concentrated sulphuric acid ($H_2SO_4$), a chlorosulfonic acid ($ClSO_3H$), a fuming sulfuric acid (fuming $SO_3$) and fuming sulfuric acid triethylphosphate ($SO_3$-TEP) may be used.

The phosphoric acid compound is not particularly limited and may include, for example, any general phosphoric acid compound known in the art to which the present invention pertains. In a preferred embodiment, diethyl hypophosphorous salt, phosphoric acid or a mixture thereof may be used.

According to embodiments of the invention, the general carboxylic acid compound is not particularly limited and may include, for example, any carboxylic acid compound known in the art to which the present invention pertains.

In addition to the method for introducing the positive ion exchange group by using a phosphoric acid compound and a carboxylic acid compound, a copolymer having the positive ion exchange group may be prepared by copolymerizing the monomers including a phosphoric acid group or carboxylic acid group in the copolymerization step of the above-mentioned monomers.

In some embodiments, the step for introducing the positive ion exchange group into the copolymerized polymer may be conducted at a suitable temperature, such as a temperature in the range of about 0 to 100° C., and preferably about 25 to 50° C.

According to an exemplary embodiment of the present invention, the above-mentioned step may be conducted by using a method for dissolving the copolymer that is synthesized when the monomer is copolymerized in a solvent, adding the compound for introducing the positive ion exchange group, reacting for 1 to 5 hours, and filtering and drying the product.

As described above, since the poly(arylene ether) copolymer according to the exemplary embodiment of the present invention has excellent physical characteristics, ion exchange ability and metal ion adsorption ability, the copolymer may be used for ion exchange resins or films, particularly a positive ion exchange resin or positive ion exchange film.

Another exemplary embodiment of the present invention provides a positive ion exchange resin comprising the poly (arylene ether) copolymer according to Formula 1.

Since the poly(arylene ether) copolymer according to the present invention has excellent solubility in various solvents at normal temperature, the copolymer can be molded in various shapes. For example, the copolymer may be manufactured in the form of a gel, porous spherical beads, and granules, and can be thus applied as an ion exchange resin, particularly a positive ion exchange resin. A molded ion exchange resin according to the present invention may be applied to a chromatography column including the ion exchange resin, a composite material including the ion exchange resin, and a filtering member including the ion exchange resin, particularly wherein the ion exchange resin is a positive ion exchange resin.

Another exemplary embodiment of the present invention provides a positive ion exchange resin including the poly (arylene ether) copolymer according to Formula 1.

The method for forming the film by using the present poly(arylene ether) copolymer is not particularly limited, and can be conducted by a general method known in the art to which the present invention pertains. Preferably, the film may be manufactured by using a method for dissolving the poly (arylene ether) copolymer in an organic solvent such as dimethylacetamide, dimethylacrylic acid (DMAc), N-methyl-2-pyrrolidone (NMP), and dimethylformamide (DMF); casting the resulting solution on a glass substrate; and drying it to remove the solvent. The poly(arylene ether) copolymer according to the present invention possesses excellent processability, and thus is convenient to form the film. According to various embodiments, in the manufacturing of the positive ion exchange film, in addition to the poly(arylene ether) copolymer according to the present invention, one or more additional components that are used in the art to which the present invention pertains when manufacturing ion exchange films may be further added.

According to an exemplary embodiment of the present invention, in addition to the poly(arylene ether) copolymer, as the hydrogen ion conductive polymer, at least one of the polymers that are selected from the group consisting of polyimide, polyetherketone, polysulfone, polyethersulfone, polyetherethersulfone, polybenzimidazole, polyphenylene oxide, polyphenylene sulfide, polystyrene, polytrifluorostyrene sulfonic acid, polystyrene sulfonic acid, polyvinylidenefluoride, polyurethane and branched sulfonated polysulfoneketone copolymer may be further included.

In addition to the additional polymer component, the ion exchange film may further include one or more inorganic materials that are selected from the group consisting of silicon oxide $SiO_2$, titanium oxide $TiO_2$, inorganic phosphoric acid, sulfonated silicon oxide (sulfonated $SiO_2$), sulfonated zirconium oxide (sulfonated ZrO) and sulfonated zirconium phosphate (sulfonated ZrP).

The ion exchange film according to the present invention may be applied to a film for desalinization, a film for concentration, a film for specific selective transmission, and an electrolyte film, and used in various fields such as electric dialysis, diffusion dialysis, reverse osmosis process, electrolyte dialysis, and fuel cell. In addition, in the manufacturing of a positive and negative photoresist, the present ion exchange film may be used to remove metal ion contaminants.

Hereinafter, in order to help the understanding of the present invention, preferred Examples are described. However, the following Examples are set forth to illustrate the present invention and should not to be construed to limit the present invention.

Example 1 a) Manufacturing of Poly(Arylene Ether) Copolymer (X=0.3)

(Reaction Equation 1-a)

As shown in Reaction Equation (1-a), under a nitrogen atmosphere, in equipment that was provided with a condenser Dean-Stark trap and a magnetic stirrer bar, to a two-neck round bottom flask the following were added: 4,4'-difluorodiphenylsulfone (20 mmol), 2,2'-diphenyl-p,p-biphenol (6 mmol) and 4,4'-dihydroxydiphenylsulfone (14 mmol) as the monomer, and potassium carbonate (24 mmol). In this case, dimethylacetamide (70 mL) and toluene (50 mL) were added thereto as the reaction solvent.

The activation step was performed at a reaction temperature of 140° C. for 4 hours. Water that was manufactured as a by product of the reaction was removed by toluene, which was the reaction solvent. The polymerization reaction was performed for 24 hours by gradually increasing the temperature to 165° C. After the reaction was finished, the resultant material was washed several times with methanol/water (volume ratio=1:1), and vacuum dried at 60° C. for 24 hours.

Figure 1:
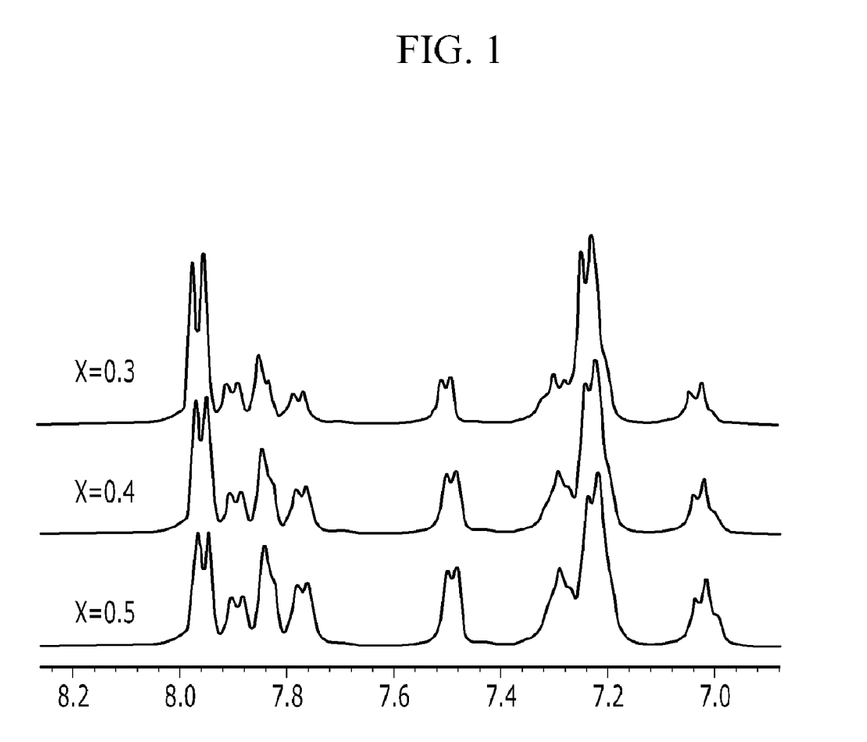
FIG. 1 is a graph that illustrates a nuclear magnetic resonance (NMR) spectrum of the poly(arylene ether) copolymer [step (a) of the manufacturing method] according to Examples 1 to 3 of the present invention.

The final product was obtained in a white solid form, $^1$H-NMR was performed to analyze the structure, and the results thereof are shown in FIG. 1 (X=0.3).

b) Manufacturing of the Sulfonated Poly(Arylene Ether) Copolymer (Reaction Equation 1-b)

Under a nitrogen atmosphere, in equipment that was provided with a condenser, a dropping funnel and a magnetic stirrer bar, in a two-neck round bottom flask 20 g of the copolymer synthesized in step (a) was dissolved in 200 mL of concentrated sulfuric acid, and agitated at room temperature for 12 hours. After the reaction was finished, water was removed by precipitation, and the remaining sulfuric acid was washed several times and vacuum-dried. The dried copolymer was dissolved in the dimethylacetamide solution, and vacuum-dried to synthesize the target poly(arylene ether) copolymer having the sulfonic acid group (weight average molecular weight: 233,000).

Figure 2:
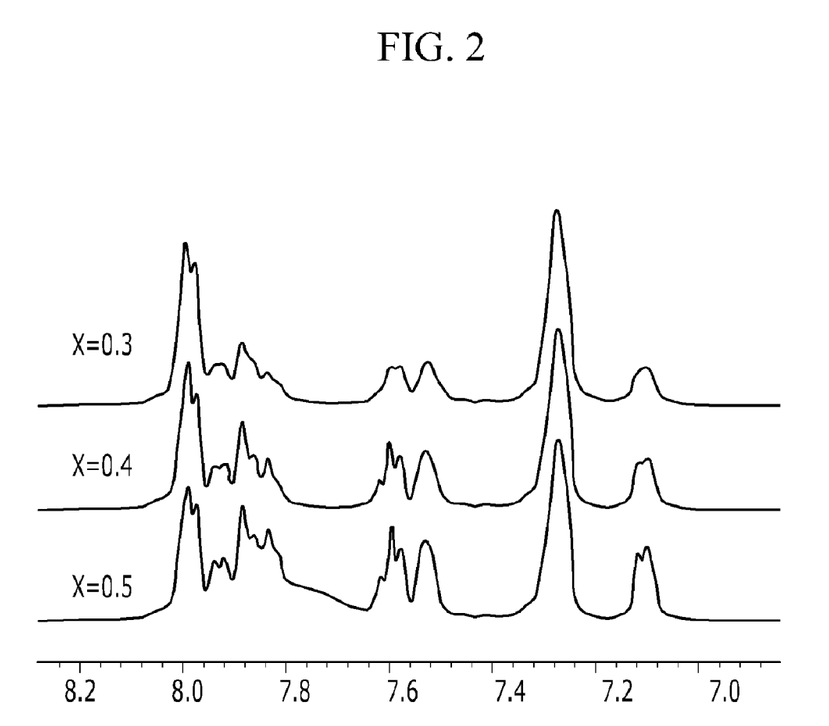
FIG. 2 is a graph that illustrates a nuclear magnetic resonance (NMR) spectrum of the sulfonated poly(arylene ether) copolymer [step (b) of the manufacturing method] according to Examples 1 to 3 of the present invention.

The final product was subjected to $^1$H-NMR to analyze the structure, and the results thereof are shown in FIG. 2 (X=0.3). As shown in FIG. 2, a peak change was shown at around 7.50 ppm while the sulfonic acid group was introduced to the copolymer, which meant that hydrogen at the alpha position of the sulfonic acid group became the down field, and it was confirmed through the area ratio that the synthesis was accomplished.

Example 2 a) Manufacturing of Poly(Arylene Ether) Copolymer (X=0.4)

(Reaction Equation 2-a)

The copolymer was manufactured by using the same conditions and method as step (a) of Example 1, except that the molar ratio of the monomers was set so that 4,4'-difluorodiphenylsulfone [20 mmol], 2,2'-diphenyl-p,p-biphenol (8 mmol) and 4,4'-dihydroxydiphenylsulfone (12 mmol) were added.

The final product was obtained in a white solid form, $^1$H-NMR was performed to analyze the structure, and the results thereof are shown in FIG. 1 (X=0.4).

b) Manufacturing of the Poly(Arylene Ether) Copolymer Having the Sulfonic Acid Group (Reaction Equation 2-b)

The copolymer having the sulfonic acid group was manufactured by using the same conditions and method as step (b) of Example 1, except that the copolymer that was synthesized in Example 2, step (a) was used (weight average molecular weight: 325,000).

The final product was subjected to $^1$H-NMR to analyze the structure, and the results thereof are shown in FIG. 2 (X=0.4). As shown in FIG. 2, the peak change was shown at around 7.50 ppm while the sulfonic acid group was introduced to the copolymer, which meant that hydrogen at the alpha position of the sulfonic acid group became the down field, and it was confirmed through the area ratio that the synthesis was accomplished.

Example 3 a) Manufacturing of Poly(Arylene Ether) Copolymer (X=0.5)

(Reaction Equation 3-a)

The copolymer was manufactured by using the same conditions and method as step (a) of Example 1, except that the molar ratio of the monomers was set so that 4,4'-difluorodiphenylsulfone [20 mmol], 2,2'-diphenyl-p,p-biphenol (10 mmol) and 4,4'-dihydroxydiphenylsulfone (10 mmol) were added (weight average molecular weight: 283,000).

The final product was obtained in a white solid form, $^1$H-NMR was performed to analyze the structure, and the results thereof are shown in FIG. 1 (X=0.5).

b) Manufacturing of the Poly(Arylene Ether) Copolymer Having the Sulfonic Acid Group (Reaction Equation 3-b)

The copolymer having the sulfonic acid group was performed by using the same condition and method as step (b) of Example 1, except that the copolymer that was synthesized in Example 3, step (a) was used.

The final product was subjected to $^1$H-NMR to analyze the structure, and the results thereof are shown in FIG. 2 (X=0.5). As shown in FIG. 2, the peak change was shown at around 7.50 ppm while the sulfonic acid group was introduced to the copolymer, which meant that hydrogen at the alpha position of the sulfonic acid group became the down field, and it was confirmed through the area ratio that the synthesis was accomplished.

Preparation Example 1

Manufacturing of the Positive Ion Exchange Film

The poly(arylene ether) copolymer that was manufactured in step (b) of Example 1 was dissolved in dimethylacetamide, cast on a glass plate, and dried at 120° C. to manufacture the polymer electrolyte film.

Preparation Example 2

Manufacturing of the Positive Ion Exchange Film

The polymer electrolyte film was manufactured by using the same method as Preparation Example 1, except that the poly(arylene ether) copolymer that was manufactured in step (b) of Example 2 was used.

Preparation Example 3

Manufacturing of the Positive Ion Exchange Film

The polymer electrolyte film was manufactured by using the same method as Preparation Example 1, except that the poly(arylene ether) copolymer that was manufactured in step (b) of Example 3 was used.

Comparative Example

The positive ion exchange film (Manufacturing company: DuPont, trademark: Nafion-211) that was commercially sold was used.

Experimental Example

1. Measurement of the Molecular Weight and Dispersibility of the Copolymer

The weight average molecular weight (Mw) and dispersibility (PDI=Mw/Mn) of the sulfonated poly(arylene ether) copolymers manufactured in Examples 1 to 3 were measured by using chromatography, and the results thereof are described in the following Table 1. The equipment and condition used in the measurement are described below.

GPC device: Waters Co., Ltd., trademark 2414
Used column: Waters Co., Ltd., trademark. HR 3, 4, 5 column
Temperature: 80° C./elution solvent: dimethylformamide/elution speed: 1 ml/min
Standard material: polymethylmethacrylate (PMMA)

2. Sulfonation Degree of the Copolymer

The sulfonation degree (%) of the sulfonated poly(arylene ether) copolymers manufactured in Examples 1 to 3 was measured by using the NMR, and the results thereof are described in the following Table 1.

3. Measurement of the Hydrogen Ion Conductivity

The hydrogen ion conductivity of the positive ion exchange film according to Preparation Examples 1 to 3 and the Comparative Example was measured by using the impedance spectroscopy (manufactured by Solartron, Co., Ltd.), and the results thereof are described in the following Table 1.

In this case, the impedance measurement condition was measured at the frequency in the range of 1 Hz to 1 MHz, and the measurement was performed in an in-plane manner, and all tests were performed while the samples were completely wet.

4. Measurement of the Methanol Transmissivity

After the respective positive ion exchange films according to Preparation Examples 1 to 3 and the Comparative Example were disposed between two cells, 15 mL of 1M methanol aqueous solution was injected into one cell, 15 mL of distilled water was injected into the other cell, 10 μl of samples were collected every 10 min from the cell into which the distilled water was injected, and 10 μl of distilled water was provided again thereto. The methanol concentration of the collected sample was measured by using gas chromatography.

The change in methanol concentration over time was recorded by using the graph, the methanol transmissivity was calculated from the slope thereof by using the following Equation 1, and the results thereof are described in the following Table 1.

$$\text{Transmissivity } [cm^2/sec] = (\text{Slope}[ppm/s] \times \text{Solution volume} \times \text{Electrolyte film thickness})/(\text{Electrolyte film area} \times \text{Methanol concentration}) \quad [\text{Equation 1}]$$

TABLE 1

| Classification | Sulfonation degree % | Weight average molecular weight ×$10^3$ | Dispersibility | Hydrogen ion conductivity (×$10^{-3}$ S/cm) | Methanol transmissivity (×$10^{-6}$ $cm^2$/sec) |
|---|---|---|---|---|---|
| Preparation Example 1 | 30 | 233 | 2.87 | 1.7 | 0.18 |
| Preparation Example 2 | 40 | 325 | 2.46 | 3.4 | 0.51 |
| Preparation Example 3 | 50 | 283 | 2.97 | 5.8 | 1.94 |
| Comparative Example | — | — | — | 3.5 | 2.10 |

As shown from the results of Table 1, since the positive ion exchange films according to Preparation Examples 1 to 3 of the present invention are manufactured by using the poly(arylene ether) copolymer having the sulfonic acid group of Examples 1 to 3, the weight average molecular weight is high while the sulfonation degree is high. As compared to the known positive ion exchange film (Comparative Example), the present films demonstrate the same or higher hydrogen ion conductivity while also ensuring low methanol transmissivity. It is thus confirmed that the performance of films according to the present invention as a polymer electrolyte film for a fuel cell is excellent.

5. Dissolution of the Copolymer to the Solvent

Whether the poly(arylene ether) copolymer was dissolved in the solvent or not was confirmed after the poly(arylene ether) copolymers were added to N-methylpyrrolidone (NMP), dimethylacetamide (DMAc), dimethylformamide (DMF), dimethylsulfoxide (DMSO), methanol (MeOH) and water at room temperature, in order to confirm whether the poly(arylene ether) copolymers having the sulfonic acid group manufactured in Examples 1 to 3 were dissolved in various solvents, and the results are described in the following Table 2.

TABLE 2

| Classification | NMP | DMAc | DMF | DMSO | MeOH | Water |
|---|---|---|---|---|---|---|
| Exemplary embodiment 1 | Dissolution | Dissolution | Dissolution | Dissolution | No dissolution | No dissolution |
| Exemplary embodiment 2 | Dissolution | Dissolution | Dissolution | Dissolution | No dissolution | No dissolution |

TABLE 2-continued

| Classification | NMP | DMAc | DMF | DMSO | MeOH | Water |
|---|---|---|---|---|---|---|
| Exemplary embodiment 3 | Dissolution | Dissolution | Dissolution | Dissolution | No dissolution | No dissolution |

As shown from the results of Table 2, since the poly(arylene ether) copolymers having the sulfonic acid group according to Examples 1 to 3 have excellent solubility in various organic solvents at room temperature, it can be confirmed that processability is excellent and that the copolymers can be useful for various purposes.

6. Measurement of the Mechanical Strength of the Positive Ion Exchange Film

The positive ion exchange film was manufactured by dissolving the poly(arylene ether)copolymers having the sulfonic acid group manufactured in Examples 1 to 3 in N-methylpyrrolidone (NMP), casting it on a glass substrate, and drying at 120° C.

The tensile strengths of the films manufactured as described above and the films of the Comparative Example (Manufacturing company: DuPont, Nafion-211®) were measured by using the Instron® mechanical testing machine according to ASTM D882, and the results are described in the following Table 3.

TABLE 3

| Classification | Exemplary embodiment 1 | Exemplary embodiment 2 | Exemplary embodiment 3 | Comparative Example |
|---|---|---|---|---|
| Tensile strength (MPa) | 45 | 42 | 40 | 20 |

As demonstrated by the results shown in Table 3, the films using the poly(arylene ether) copolymers according to Examples 1 to 3 have excellent physical/mechanical characteristics and solubility to the organic solvent, particularly because of the high molecular weight as compared to the known film (Comparative Example). Thus, films in accordance with the present invention are expected to be easily used as an ion exchange resin or film, particularly a positive ion exchange resin or positive ion exchange film.

7. Measurement of the Ion Exchange Capacity

The hydrogen ion ($H^+$) was substituted by sodium ion ($Na^+$) by supporting the positive ion exchange films according to Preparation Examples 1 to 3 in 0.1 M NaCl solution for 48 hours or more. The substituted hydrogen ion was titrated with 0.01 N NaOH standard solution, the ion exchange capacity (IEC) value of the polymer film was calculated with the amount of NaOH used in the titration according to the following Equation 2, and the results are described in the following Table 4.

$$IEC(meq/g) = (V_{NaOH} \times C_{NaOH})/W_{dry} \quad \text{[Equation 2]}$$

(in Equation 1, $W_{dry}$: weight (g) of the dried film, $V_{NaOH}$: consumed NaOH standard solution (mL), $C_{NaOH}$: concentration (M) of the NaOH standard solution)

TABLE 4

| Classification | Preparation Example 1 | Preparation Example 2 | Preparation Example 3 |
|---|---|---|---|
| Ion exchange capacity (meq/g) | 1.11 | 1.42 | 1.70 |

As shown in the result of Table 4, the positive ion exchange films according to Preparation Examples 1 to 3 demonstrated high ion exchange capacity.

8. Measurement of the Adsorption Ability to the Metal Ion

The adsorption test to the copper and nickel ions was conducted by using the following process in order to examine the adsorption ability of the poly(arylene ether) copolymers having the sulfonic acid group manufactured in Examples 1 to 3 to the metal ion.

The pH of the metal ion solution in the amount of 50 mg/L was controlled with a hydrochloric acid and sodium hydroxide so that the pH were 1.65 and 8.55, 0.3 g of the poly(arylene ether) copolymers having the sulfonic acid group manufactured in Examples 1 to 3 were weighed and added thereto, and they were treated at 25° C. for 24 hours. After the adsorption test, the metal ion concentration in the metal ion solution was measured by the ICP-AES (Inductively Coupled Plasma-Atomic Emission Spectrometer), and the results are described in the following Table 5.

TABLE 5

| | Classification | | | |
|---|---|---|---|---|
| | Copper ion concentration (ppm) | | Nickel ion concentration (ppm) | |
| Classification | pH 1.65 | pH 8.55 | pH 1.65 | pH 8.55 |
| Example 1 | 125 | 123 | 99 | 135 |
| Example 2 | 450 | 411 | 401 | 451 |
| Example 3 | 601 | 524 | 502 | 601 |
| Metal ion original solution | 850 | 850 | 850 | 850 |

As shown in the result of Table 5, the poly(arylene ether) copolymers having the sulfonic acid group according to Examples 1 to 3 demonstrated excellent metal ion adsorption ability.

9. Evaluation of the Positive Ion Exchange Characteristic

In a water treatment module having the structure as shown in the following Table 6 (in the following Table 6, CMX: positive ion exchange film manufactured by Astom, Co., Ltd., and AMX: negative ion exchange film manufactured by Astom, Co., Ltd.), the positive ion exchange characteristic of the positive ion exchange films manufactured in Preparation Examples 1 to 3 were evaluated under the raw water test condition (100 ppm NaCl solution, pH 5.78) while the flow amount was 30 ml/min, pressure was 0.3 to 0.5 kgf/cm2, purified water was 180 sec, short was 60 sec, drain water was 50 sec, and separation was 10 sec, and the results are described in the following Table 7.

TABLE 6

| Classification | module 1 | module 2 | module 3 | module 4 |
|---|---|---|---|---|
| Cathode | CMX | Preparation Example 1 | Preparation Example 2 | Preparation Example 3 |
| Anode | AMX | AMX | AMX | AMX |

TABLE 7

| Classification | module 1 | module 2 | module 3 | module 4 |
|---|---|---|---|---|
| Treatment efficiency (%) | 84 | 85 | 84 | 85 |
| Water purification average pH | 6.08 | 6.12 | 6.07 | 6.15 |

As shown in the result of Table 7, since the positive ion exchange ability of the positive ion exchange films according to Preparation Examples 1 to 3 is the same as or higher than that of commercial products, the films can be useful in a purifying device for water treatment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A poly(arylene ether) copolymer represented by Formula 1:

[Formula 1]

wherein,
at least one of the R's is a sulfonic acid group ($-SO_3^-M^+$), a phosphoric acid group ($-PO_3^-M^+$) or a carboxyl group ($-COO^-M^+$), and any remainder R's are a hydrogen group ($-H$), and $M^+$ is a positive ion;

$Ar_1$ is one or more substituent groups that are selected from the group consisting of the following Formula 5a,

[Formula 5a]

$Ar_2$ is one or more substituent groups that are selected from the group consisting of the following Formula 6a,

[Formula 6a]

-continued

X ranges from about 0.01 to 1.0, n is an integer and ranges from about 10 to 800.

2. A poly(arylene ether) copolymer represented by Formula 2:

[Formula 2]

wherein

Ar$_1$ is one or more substituent groups that are selected from the group consisting of the following Formula 5a,

[Formula 5a]

Ar$_2$ is one or more substituent groups that are selected from the group consisting of the following Formula 6a,

[Formula 6a]

-continued

X ranges from about 0.01 to 1.0, n is an integer and ranges from about 10 to 800.

3. A poly(arylene ether) copolymer that is represented by Formula 3 and has a sulfonic acid group:

[Formula 3]

wherein,

Ar$_1$ is one or more substituent groups that are selected from the group consisting of the following Formula 5a,

[Formula 5a]

-continued

Ar₂ is one or more substituent groups that are selected from the group consisting of the following Formula 6a,

[Formula 6a]

-continued

X ranges from about 0.01 to 1.0,
n is an integer and ranges from about 10 to 800.

4. The poly(arylene ether) copolymer of claim 1, wherein the copolymer is a random copolymer or a block copolymer.

5. The poly(arylene ether) copolymer of claim 1, wherein:
X ranges from 0.1 to 0.9.

6. The poly(arylene ether) copolymer of claim 1, wherein:
X ranges from 0.2 to 0.8.

7. The poly(arylene ether) copolymer of claim 1, wherein:
the copolymer has a weight average molecular weight of about 10,000 to 1,000,000.

8. The poly(arylene ether) copolymer of claim 1, wherein:
the weight average molecular weight is about 30,000 to 800,000.

9. A method for manufacturing the poly(arylene ether) copolymer of claim 1, comprising:
a) copolymerizing 2,2'-diphenyl-p,p-biphenol of the following Formula 4, one or more monomers that are selected from the group consisting of the following Formula 5b, and one or more monomers that are selected from the group consisting of the following Formula 6b; and
b) introducing a positive ion exchange group into the copolymerized polymer:

-continued the positive ion exchange group is a sulfonic acid group (—SO$_3^-$M$^+$), a phosphoric acid group (—PO$_3$M$^+$) or a carboxyl group (—COO$^-$M$^+$), and M$^+$ is a positive ion,
in Formula 5b, each X is an atom that is independently selected from a halogen group.

10. The method of claim 9, wherein:
a) the copolymerizing of the monomers is conducted so that an equivalent ratio of one or more monomers that are selected from the group consisting of Formula 5b, 2,2'-diphenyl-p,p-biphenol, and one or more monomers that are selected from the group consisting of Formula 6b is 1:0.05 to 0.95:0.05 to 0.95.

11. The method of claim 9, wherein:
a) the copolymerizing of the monomers is conducted so that an equivalent ratio of one or more monomers that are selected from the group consisting of Formula 5b, 2,2'-diphenyl-p,p-biphenol, and one or more monomers that are selected from the group consisting of Formula 6b is 1:0.2 to 0.8:0.2 to 0.8.

12. The method of claim 9, wherein:
a) the copolymerizing of the monomers is conducted in the presence of one or more solvents that are selected from the group consisting of dimethylacetamide, N-methylpyrrolidone, dimethylformamide, dimethyl sulfoxide, methylene chloride, chloroform, tetrahydrofuran, benzene, toluene and xylene.

13. The method of claim 9, wherein:
b) the introducing of the positive ion exchange group into the copolymerized polymer is conducted by using one or more sulfonic acid compounds that are selected from the group consisting of a concentrated sulphuric acid, a chlorosulfonic acid, a fuming sulfuric acid (fuming SO$_3$) and fuming sulfuric acid triethylphosphate.

14. The method of claim 9, wherein:
b) the introducing of the positive ion exchange group into the copolymerized polymer is conducted at a temperature in the range of about 0 to 100° C.

15. A positive ion exchange resin comprising the poly (arylene ether) copolymer of claim 1.

16. A positive ion exchange film comprising the poly (arylene ether) copolymer of claim 1.

17. The positive ion exchange film of claim 16, wherein:
the positive ion exchange film further includes one or more polymers that are selected from the group consisting of polyimide, polyetherketone, polysulfone, polyethersulfone, polyetherethersulfone, polybenzimidazole, polyphenylene oxide, polyphenylenesulfide, polystyrene, polytrifluorostyrene sulfonic acid, polystyrene sulfonic acid, polyvinylidenefluoride, polyurethane and branched-chained sulfonated polysulfoneketone copolymer.

18. The positive ion exchange film of claim 16, wherein:
the positive ion exchange film may further include one or more inorganic materials that are selected from the group consisting of silicon oxide SiO$_2$, titanium oxide TiO$_2$, inorganic phosphoric acid, sulfonated silicon oxide, sulfonated zirconium oxide and sulfonated zirconium phosphate.

19. A method for manufacturing the poly(arylene ether) copolymer of claim 1, comprising:
a) copolymerizing 2,2'-diphenyl-p,p-biphenol of the following Formula 4, one or more monomers that are selected from the group consisting of the following Formula 5b, and one or more monomers that are selected from the group consisting of the following Formula 6b; and
b) introducing an ion exchange group into the copolymerized polymer:

[Formula 4]

[Formula 5b]

wherein the ion exchange group is a negative ion exchange group or a mixed ion exchange group, in Formula 5b, each X is an atom that is each independently selected from a halogen group.

20. An ion exchange resin comprising the poly(arylene ether) copolymer of claim 1.

21. The ion exchange resin of claim 20 wherein the ion exchange resin is a negative ion exchange resin or a mixed ion exchange resin.

22. An ion exchange film comprising the poly(arylene ether) copolymer of claim 1.

23. The ion exchange film of claim 22 wherein the ion exchange film is a negative ion exchange film or a mixed ion exchange film.

* * * * *